United States Patent
Jin et al.

(10) Patent No.: US 11,790,038 B2
(45) Date of Patent: Oct. 17, 2023

(54) RARE POSE DATA GENERATION

(71) Applicant: Waymo LLC, Mountain View, CA (US)

(72) Inventors: Xiaohan Jin, Mountain View, CA (US); Junhua Mao, Palo Alto, CA (US); Ruizhongtai Qi, Mountain View, CA (US); Congcong Li, Cupertino, CA (US); Huayi Zeng, St. Louis, MO (US)

(73) Assignee: Waymo LLC, Mountain View, CA (US)

( * ) Notice: Subject to any disclaimer, the term of this patent is extended or adjusted under 35 U.S.C. 154(b) by 44 days.

(21) Appl. No.: 17/528,129

(22) Filed: Nov. 16, 2021

(65) Prior Publication Data

US 2022/0156511 A1     May 19, 2022

Related U.S. Application Data

(60) Provisional application No. 63/114,372, filed on Nov. 16, 2020.

(51) Int. Cl.
*G06F 18/2134* (2023.01)
*G06T 15/06* (2011.01)
(Continued)

(52) U.S. Cl.
CPC .... *G06F 18/21347* (2023.01); *G06F 18/2148* (2023.01); *G06N 3/08* (2013.01);
(Continued)

(58) Field of Classification Search
CPC ........... G06F 18/21347; G06F 18/2148; G06F 18/214; G06N 3/08; G06N 3/045; G06N 3/088; G06T 15/06; G06T 17/20; G06T 19/20; G06T 2219/2004; G06T 2210/56; G06T 17/00; G06V 20/56; G06V 40/103; G06V 20/64; G06V 10/82
See application file for complete search history.

(56) References Cited

U.S. PATENT DOCUMENTS

| | | | |
|---|---|---|---|
| 11,010,951 B1 * | 5/2021 | Schwartz | ................ G06F 3/012 |
| 2018/0082172 A1 * | 3/2018 | Patel | ...................... G06N 3/047 |

(Continued)

OTHER PUBLICATIONS

Yin et al., "LOGAN Unpaired Shape Transform in Latent Overcomplete Space", 2019, Association for Computing Machinery (Year: 2019).*

(Continued)

*Primary Examiner* — YuJang Tswei
(74) *Attorney, Agent, or Firm* — Fish & Richardson P.C.

(57) ABSTRACT

Methods, systems, and apparatus, including computer programs encoded on computer storage media, for generating rare pose data. One of the methods includes obtaining a three-dimensional model of a dynamic object, wherein the dynamic object has multiple movable elements that define a plurality of poses of the dynamic object. A plurality of template poses of the dynamic object are used to generate additional poses for the dynamic object including varying angles of one or more key joints of the dynamic object according to the three-dimensional model. Point cloud data is generated for the additional poses generated for the dynamic object.

20 Claims, 5 Drawing Sheets

(51) Int. Cl.
| | |
|---|---|
| *G06T 19/20* | (2011.01) |
| *G06N 3/08* | (2023.01) |
| *G06T 17/20* | (2006.01) |
| *G06V 20/56* | (2022.01) |
| *G06V 40/10* | (2022.01) |
| *G06F 18/214* | (2023.01) |
| *G06N 3/088* | (2023.01) |
| *G06V 10/82* | (2022.01) |
| *G06T 17/00* | (2006.01) |
| *G06N 3/045* | (2023.01) |
| *G06V 20/64* | (2022.01) |

(52) U.S. Cl.
CPC ............... *G06T 15/06* (2013.01); *G06T 17/20* (2013.01); *G06T 19/20* (2013.01); *G06V 20/56* (2022.01); *G06V 40/103* (2022.01); *G06F 18/214* (2023.01); *G06N 3/045* (2023.01); *G06N 3/088* (2013.01); *G06T 17/00* (2013.01); *G06T 2210/56* (2013.01); *G06T 2219/2004* (2013.01); *G06V 10/82* (2022.01); *G06V 20/64* (2022.01)

(56) References Cited

U.S. PATENT DOCUMENTS

| | | | | |
|---|---|---|---|---|
| 2021/0082185 | A1* | 3/2021 | Ziegler | G06T 7/50 |
| 2021/0125036 | A1* | 4/2021 | Tremblay | G05D 1/0088 |
| 2021/0233273 | A1* | 7/2021 | Spurr | G06V 20/647 |
| 2021/0329306 | A1* | 10/2021 | Liu | G06V 40/168 |
| 2022/0005332 | A1* | 1/2022 | Metzler | G08B 13/19647 |

OTHER PUBLICATIONS

Spurek et al., "Hypernetwork approach to generating point clouds", 2003, arXiv (Year: 2003).*

Insafutdino et al., "Unsupervised Learning of Shape and Pose with Differentiable Point Clouds", 2018, Neural Information Processing Systems (Year: 2018).*

Bogo et al., "Keep it SMPL: Automatic estimation of 3d human pose and shape from a single image," European Conference on Computer Vision, 2016, pp. 561-578.

Caccia et al., "Deep generative modeling of LiDAR data," 2019 IEEE/RSJ International Conference on Intelligent Robots and Systems, Nov. 2019, 7 pages.

Chen et al., "Object as hotspots: An anchor-free 3D object detection approach via firing of hotspots," European Conference on Computer Vision, Nov. 2020, pp. 68-84.

Chen et al., "Synthesizing training images for boosting human 3D pose estimation," 2016 Fourth International Conference on 3D Vision (3DV), Oct. 2016, pp. 479-488.

Cheng et al., "Improving 3D object detection through progressive population based augmentation," European Conference on Computer Vision, Nov. 2020, pp. 279-294.

Choi et al., "Part-aware data augmentation for 3D object detection in point cloud," 2021 IEEE/RSJ International Conference on Intelligent Robots and Systems, Oct. 2021, 7 pages.

Chumlea et al., "Prediction of stature from knee height for black and white adults and children with application to mobility impaired or handicapped persons," Journal of the American Dietetic Association, Dec. 1994, 94(12):1385-1391.

Doersch et al., "Sim2real transfer learning for 3d human pose estimation: motion to the rescue," Advances in Neural Information Processing Systems 32, 2019, pp. 12949-12961.

Fang et al., "Augmented lidar simulator for autonomous driving," IEEE Robotics and Automation Letters, Apr. 2020, 5(2):1931-1938.

Ghezelghieh et al., "Learning camera viewpoint using CNN to improve 3D body pose estimation," 2016 Fourth International Conference on 3D Vision (3DV), Oct. 2016, pp. 4321-4329.

Goodfellow et al., "Generative adversarial nets," Advances in neural information processing systems, 2014, pp. 2672-2680.

Hoffmann et al., "Learning to train with synthetic humans," German Conference on Pattern Recognition, Oct. 2019, pp. 609-623.

Kim et al., "PedX: Benchmark dataset for metric 3-D pose estimation of pedestrians in complex urban intersections," IEEE Robotics and Automation Letters, Apr. 2019, 4(2):1940-1947.

Lang et al., "Pointpillars: Fast encoders for object detection from point clouds," Proceedings of the IEEE/CVF Conference on Computer Vision and Pattern Recognition, 2019, pp. 12697-12705.

Li et al., "Pointaugment: an auto-augmentation framework for point cloud classification," Proceedings of the IEEE/CVF Conference on Computer Vision and Pattern Recognition, 2020, pp. 6378-6387.

Li et al., "PU-GAN: a point cloud upsampling adversarial network," Proceedings of the IEEE/CVF International Conference on Computer Vision, 2019, pp. 7203-7212.

Loper et al., "SMPL: A skinned multiperson linear model," ACM transactions on graphics, Nov. 2015, 34(6):1-16.

Manivasagam et al., "Lidarsim: Realistic lidar simulation by leveraging the real world," Proceedings of the IEEE/CVF Conference on Computer Vision and Pattern Recognition, 2020, pp. 11167-11176.

Mao et al., "Least squares generative adversarial networks," Proceedings of the IEEE International Conference on Computer Vision, 2017, pp. 2794-2802.

Marin et al., "Learning appearance in virtual scenarios for pedestrian detection," 2010 IEEE Computer Society Conference on Computer Vision and Pattern Recognition, Jun. 2010, pp. 137-144.

Neigel et al., "OPEDD: Off-road pedestrian detection dataset," Journal of WSCG, 2020, 28(1-2):197- 202.

Pavlakos et al., "Expressive body capture: 3d hands, face, and body from a single image," Proceedings of the IEEE Conference on Computer Vision and Pattern Recognition, 2019, pp. 10975-10985.

Pezzementi et al., "Comparing apples and oranges: Off-road pedestrian detection on the NREC agricultural person-detection dataset," CoRR, Jul. 2017, arXiv:1707.07169, 28 pages.

Pishchulin et al., "Articulated people detection and pose estimation: Reshaping the future," 2012 IEEE Conference on Computer Vision and Pattern Recognition, Jun. 2012, pp. 3178-3185.

Qi et al., "Pointnet: Deep learning on point sets for 3d classification and segmentation," Proceedings of the IEEE Conference on Computer Vision and Pattern Recognition, 2017, pp. 652-660.

Rahmani et al., "Learning a non-linear knowledge transfer model for cross-view action recognition," Proceedings of the IEEE conference on computer vision and pattern recognition, 2015, pp. 2458-2466.

Rogez et al., "Mocap-guided data augmentation for 3d pose estimation in the wild," Advances in neural information processing systems 29, 2016, pp. 3108-3116.

Sajat et al., "Detection of human bodies in lying position based on aggregate channel features," 2020 16th IEEE International Colloquium on Signal Processing & Its Applications, Feb. 2020, pp. 313-317.

Sallab et al., "Lidar sensor modeling and data augmentation with gans for autonomous driving," CoRR, May 2019, arXiv:1905.07290, 9 pages.

Sallab et al., "Unsupervised neural sensor models for synthetic lidar data augmentation," CoRR, Nov. 2019, arXiv: 1911.10575, 9 pages.

Saputra et al., "Casualty detection from 3d point cloud data for autonomous ground mobile rescue robots," 2018 IEEE International Symposium on Safety, Security, and Rescue Robotics, Aug. 2018, pp. 1-7.

Shi et al., "PV-RCNN: Pointvoxel feature set abstraction for 3D object detection," Proceedings of the IEEE/CVF Conference on Computer Vision and Pattern Recognition, 2020, pp. 10529-10538.

Varol et al., "Cordelia Schmid Learning from synthetic humans," Proceedings of the IEEE Conference on Computer Vision and Pattern Recognition, 2017, pp. 109-117.

Varol et al., "Synthetic humans for action recognition from unseen viewpoints," International Journal of Computer Vision, May 2021, 129:2264-2287.

(56) References Cited

OTHER PUBLICATIONS

Vertal et al., "Implementation of an active safety system for pedestrian detection in volvo's cars and the real benefits of the system based on selected real-life fatal pedestrian accidents," 2016, 8 pages.

Wang et al., "Frustum convnet: Sliding frustums to aggregate local point-wise features for amodal 3d object detection," 2019 IEEE/RSJ International Conference on Intelligent Robots and Systems, Nov. 2019, 8 pages.

Wu et al., "Learning a probabilistic latent space of object shapes via 3D generative-adversarial modeling," Advances in neural information processing systems 29, 2016, pp. 82-90.

Xu et al., "GHUM & GHUML: Generative 3D Human Shape and Articulated Pose Models," Proceedings of the IEEE/CVF Conference on Computer Vision and Pattern Recognition, 2020, pp. 6184-6193.

Yan et al., "SECOND: Sparsely embedded convolutional detection," Sensors, Aug. 2018, 18(10):3337.

Yang et al., "Fall detection for multiple pedestrians using depth image processing technique," Computer methods and programs in biomedicine, Apr. 2014, 114(2):172-182.

Yang et al., "FoldingNet:Point Cloud Auto-Encoder via Deep Grid Deformation," Proceedings of the IEEE Conference on Computer Vision and Pattern Recognition, 2018, pp. 206-215.

Yuan et al., "PCN: Point Completion Network," 2018 International Conference on 3D Vision (3DV), Sep. 2018, pp. 728-737.

Zhou et al., "Voxelnet: End-to-end learning for point cloud based 3D object detection," Proceedings of the IEEE Conference on Computer Vision and Pattern Recognition, 2018, pp. 4490-4499.

Zhu et al., "Class-balanced grouping and sampling for point cloud 3D object detection," CoRR, Aug. 2019, arXiv: 1908.09492, 8 pages.

Zhu et al., "Reconstructing NBA players," European Conference on Computer Vision, Oct. 2020, pp. 177-194.

\* cited by examiner

RARE POSE DATA GENERATION

CROSS-REFERENCE TO RELATED APPLICATIONS

This application claims the benefit under 35 U.S.C. § 119(e) of the filing date of U.S. Provisional Patent Application No. 63/114,372, filed on Nov. 16, 2020, entitled "RARE POSE DATA GENERATION," the entirety of which is herein incorporated by reference.

BACKGROUND

This specification relates to generating artificial sensor data for autonomous vehicles.

Autonomous vehicles include fully autonomous or semi-autonomous cars, boats, and aircraft. Autonomous vehicles use a variety of on-board sensors and computer systems to detect nearby objects, such as pedestrians, and use such detections to make control and navigation decisions.

The perception systems of autonomous vehicles commonly use machine learning techniques to train models to recognize such objects. The machine learning models can be trained using sensor data collected from driving trips through the real world. These techniques can be used to automatically collect vast amounts of training data to recognize commonly encountered objects, including buildings, cars, trees, and signs.

However, there are many types of dynamic objects that are rarely if ever encountered during such driving trips. For example, pedestrians can be encountered that assume rare poses that did not occur in training data. The ability to recognize a pedestrian in such rare poses, even when that situation had never been encountered in the field, is an important safety goal for self-driving vehicles.

BRIEF DESCRIPTION OF THE DRAWINGS

Like reference numbers and designations in the various drawings indicate like elements.

DETAILED DESCRIPTION

This specification describes how a system can automatically and scalably generate training data for training a perception model to detect dynamic objects having rare poses. In this specification, a dynamic object is an object having a plurality of elements that can form a plurality of poses by moving the elements relative to one another. The pose of a dynamic object is defined by the relative subposes of its movable elements, with each subpose being data that describes the position and orientation of an element relative to other elements of the dynamic object. A dynamic object itself can have a position and an orientation that is independent of the pose.

An example of a dynamic object is a pedestrian, whose arms, legs, and head, for example, can move relative to each other. The examples described in this specification will relate primarily to the task of automatically generating training data representing poses of pedestrians, but the same techniques can be applied to automatically generate training data for other types of dynamic objects as well, including animals, bicycles, robots, or other types of machines.

Particular embodiments of the subject matter described in this specification can be implemented so as to realize one or more of the following advantages. A system can automatically generate large amounts of high-quality training data for recognizing dynamic objects in a scalable way. These techniques can effectively reduce the amount of actual training data that needs to be gathered from real-world environments. From a small set of template poses, many different sets of poses can be generated and from many different angles and distances. Using template poses also speeds up the process of generating training data by greatly constraining the space of poses that need to be generated while still allowing for learning of many rare or unseen poses. This also speeds up the actual training process by focusing the training data on poses generated from the template poses.

These techniques thus provide a new capability for dynamic object recognition, which is the ability to correctly recognize dynamic objects having poses that have rarely or never been observed empirically. The ability to apply these techniques to detect pedestrians greatly enhances the safety, performance, and reliability of autonomous vehicles (AVs) that use these techniques. In this specification, an autonomous vehicle is any appropriate vehicle capable of fully autonomous control or semi-autonomous control. For example, an autonomous vehicle can be a self-driving car or a vehicle equipped with a driver assistance system that can allow a human to operate the vehicle and also suggest control decisions, e.g., steer left or apply brakes, or make such control decisions automatically.

Compared to the purely generative model based approach, the techniques described in this specification can construct an initial initialization from a human 3D model. The initialization provides the foundation for GANs to be conditioned on, which significantly simplifies the learning target and makes the training process more efficient and computationally tractable. At the same time, the GAN components increase the realism of the initial point clouds generated from the human 3D models and lead to a significant boost of the pedestrian classification performance using the generated data. In some implementations, a human 3D modeling phase as described below can be used to provide additional flexibility for the users to inform the system of the target poses.

The techniques described in this specification provide a flexible and powerful LiDAR data augmentation and synthesis framework for rare poses that are based on human 3D models and data generated by GANs. Users can flexibly specify the poses they are interested in. Empirically, the techniques described in this specification provide a framework that can generate realistic and diversified pedestrian point clouds with inputs of user-specified poses.

Figure 1:
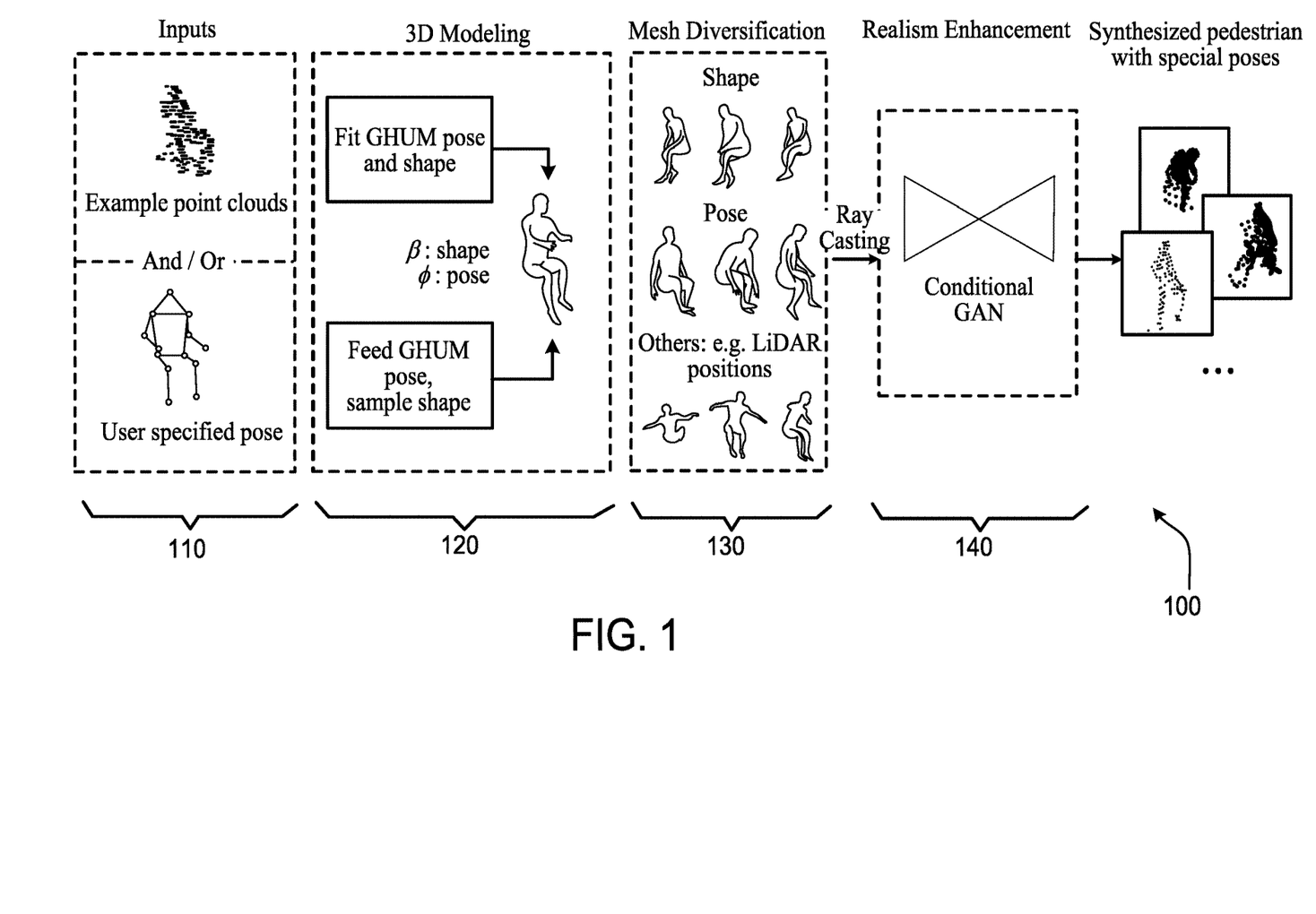
FIG. 1 is a diagram of the phases of an example 3D pedestrian point cloud data augmentation system.

FIG. 1 is a diagram of the phases of an example 3D pedestrian point cloud data augmentation system 100. The system 100 is an example implementation of the techniques described in this specification. The example system 100 has three primary phases: 3D modeling 120, mesh diversification 130, and realism enhancement 140. Other implementations of the techniques described in this specification may have more or fewer phases. The operations of these phases can be performed by a system of one or more computers in one or more locations. Typically, the operations are performed by a distributed computing system having hundreds or thousands of computers operating at least partially in parallel.

The point cloud data augmentation system 100 can accept one or more types of inputs 110. For example, the inputs 110 can include 3D point cloud data 105 of pedestrian poses, e.g., with rare poses, from real driving data, user-specified poses 107 in the representation of the 3D keypoints or skeletons, or a combination of both.

In some embodiments, during the 3D modeling phase 120, the system can use human 3D models, e.g., generative 3D human shape (GHUM and GHUML) models, to parameterize the user inputs. If the input 110 includes a set of 3D point cloud data 105, the system can fit the human 3D models to these point clouds and compute both pose and shape parameters of the human 3D model. In some embodiments, if the input 110 is a user-specified pose 107, the system can set the pose parameters in a human 3D model and select the shape parameters from the model. In some implementations, the system can sample the shape parameters from a probabilistic distribution, e.g., a Gaussian distribution.

The output of the 3D modeling phase 120 is a human 3D model with pose and shape parameters. The system can reconstruct the 3D mesh of the pedestrians with these shape parameters and the human 3D models.

In some embodiments, during a mesh diversification phase 130, the system can apply a set of transformations to the meshes, e.g., shape augmentations, pose augmentation, and virtual LiDAR position transformations, to name just a few examples. This process can thus generate a large, rich set of 3D meshes from a relatively small number of user inputs 110.

In some embodiments, during a realism enhancement phase 140, the system can perform raycasting on the generated meshes to generate initial point clouds. The system can then use generative adversarial networks (GANs) to enhance the realism of the generated point clouds. For example, real LiDAR data is typically incomplete and is usually generated in the presence of significant noise. Using a GAN can transform otherwise perfectly generated point clouds from the raycasting process into point clouds that more closely resemble data collected in the field. In experiments, both the mesh diversification phase 130 and the realism enhancement phase 140 are beneficial to improve the quality of the generated point cloud data, which in turn improves the real-world detection and classification capabilities of perception systems trained on the generated point cloud data. Therefore, autonomous vehicles that use such perception systems are better able to identify pedestrians assuming rare poses that were never actually encountered in the originally collected trip data.

Figure 2:
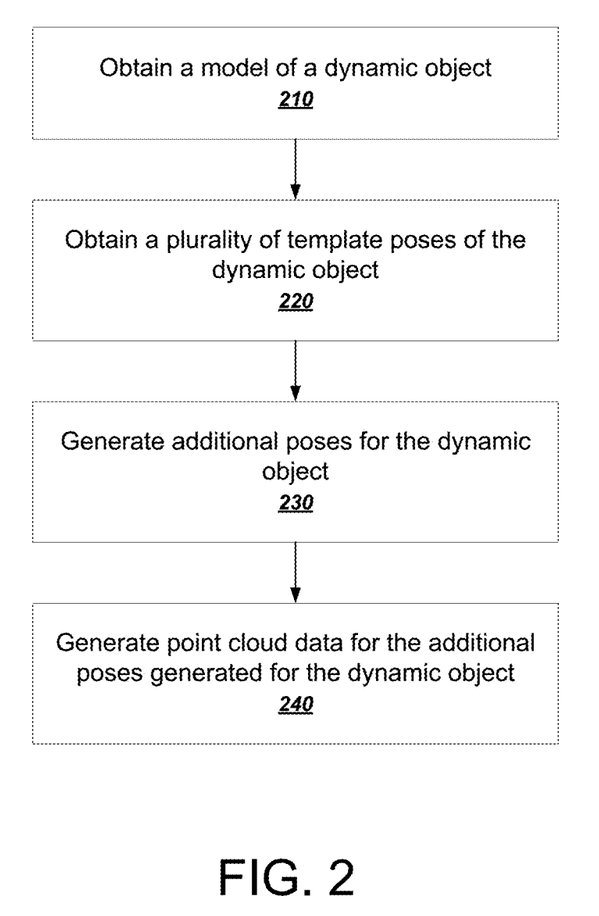
FIG. 2 is a flowchart of an example process for augmenting 3D point cloud data.

FIG. 2 is a flowchart of an example process for augmenting 3D point cloud data. The example process can be performed by any appropriate computing system having one or more computers in one or more locations and programmed in accordance with this specification. Typically, the process is performed by a massively parallel distributed computing system having hundreds of computers. For example, the example process can be performed by a data augmentation system, e.g., the data augmentation subsystem 512 described below with reference to FIG. 5. For convenience, the example process will be described as being performed by a system of one or more computers in accordance to some embodiments.

The system obtains a model of a dynamic object (210). As described above, during a 3D modeling stage, the system can take input from either LiDAR point cloud data or a user-specified skeleton and can produce pose and shape parameters for a model of the dynamic object, e.g., a human model.

The system can use any appropriate 3D model for the dynamic object. When modeling pedestrians, the system can use any appropriate model for human forms. For example, the system can use a parameterized model having two underlying latent variables, a shape $\beta$ and a pose $\varphi$. The shape $\beta$ controls the entire body appearance, while the pose $\varphi$ determines the joint position J. One example human model is a generative parameterized model named GHUML, which is described in more detail in Xu et al., *GHUM & GHUML: Generative 3D Human Shape and Articulated Pose Models*, In the Proceedings of the IEEE/CVF Conference on Computer Vision and Pattern Recognition, pages 6184-6193 (2020), which is herein incorporated by reference. The GHUML model is a parameterized model such that it contains a generative latent space from which pose and shape samples can be obtained from Gaussian distributions.

The system obtains a plurality of template poses of the dynamic object (220). Each template pose represents a pose from which other poses will be generated. One of the major advantages of the techniques described in this specification provides the flexibility for users to specify template poses of pedestrians they want to generate. The system can accept one or more of:

A set of point clouds for the special pose pedestrians.
The 3D skeletons of the poses of interest.

Often, the point cloud examples come from LiDaR point cloud data from actual driving trips.

Using 3D skeletons offers flexibility and diversity by allowing users to manually specify some poses of interest. These poses may not even appear in real driving data. The inputs can be fed into the 3D modeling stage to generate parameterized human meshes as shown below. Using point clouds and 3D skeletons as input provides significant advantages over other approaches. For example, one way to augment human data is to directly sample poses and shapes from the latent space. But in reality, this turns out to be impractical when the goal is to generate target poses that are rarely seen at all. In practice, most of the sampled poses are small variations from a normal standing human, greatly limiting the diversity of the dataset.

Instead, the system can utilize the two different types of user inputs described above to guide the data generation of targeted poses.

If the input is point cloud data, the system can fit a 3D model to the input point cloud data. To do so, the system can fit a human 3D model to a LiDAR point cloud $P_{gt}$. For example, the system can fit the 3D model to the point cloud data by performing an optimization process to minimize a distance metric between the model and the point cloud locations. In some implementations, the system uses a distance metric that incorporates the Chamfer distance and a 2D keypoint projection distance according to:

$$E(J,\theta,s) = \lambda_1 E_{Chamfer}(sP(J,\theta),P_{gt}) + \lambda_2 E_{ProjectedKeypoint}(sK(J,\theta),K^{Anno}) + \lambda_3 E_{reg}(J)$$

where λ1, λ2, and λ3 are coefficients that scale the various components of the distance metric.

$E_{chamfer}$ represents the Chamfer distance between s-scaled GHUM vertices P and input the LiDAR cloud $P_{gt}$.

$E_{ProjectedKeypoint}$ represents the L1 distance between reprojected Keypoints K(J, θ) and annotated 2D keypoints $K^{Anno}$. And $E_{reg}(J)$ is a regularization term used to limit overshooting the joints, given by $$E_{reg}(J) = \sum_{j \in J} \exp(10(L(j) - j) + \exp(10(j - U(j))).$$

The lower bound $L(j)$ and the upper bound $U(j)$ can be manually set for each joint $j$ of the 3D model.

FIGS. 3A-3D illustrate fitting a 3D model to point cloud data.

Figure 3A:
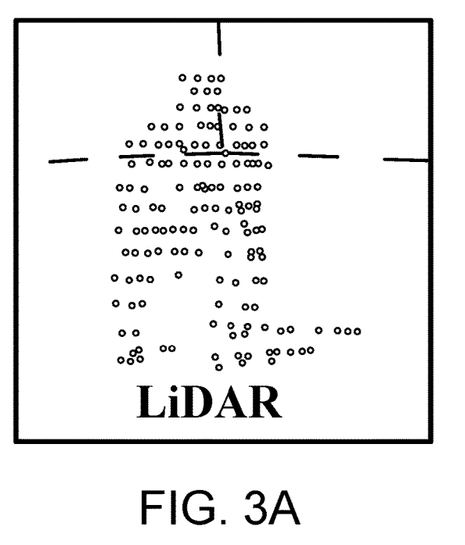
FIGS. 3A-3D illustrate fitting a 3D model to point cloud data.

FIG. 3A illustrates the input point cloud data. In this example, the point cloud data comes from real or simulated LiDAR detections. Each LiDar detection can provide a location in three dimensional space for reflections off of a human.

Figure 3B:
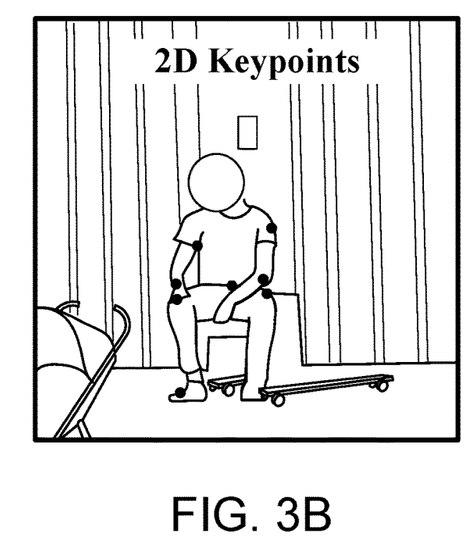

FIG. 3B illustrates annotated 2D keypoints. The annotated keypoints indicate areas of interest on a human, e.g., feet, ankles, knees, elbows, wrists, hands, shoulders, and head, to name just a few examples. The annotations can be specified manually or automatically generated by a keypoint classifier.

Figure 3C:
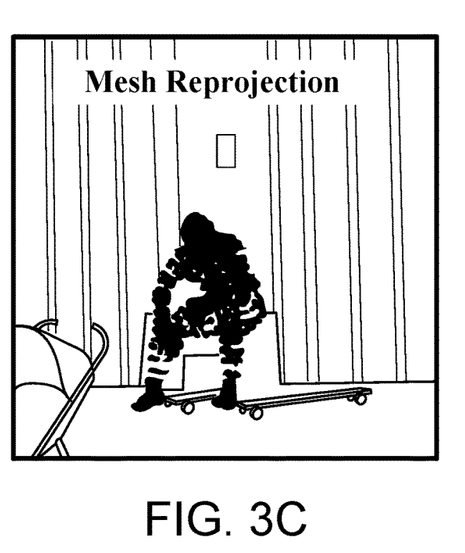

FIG. 3C illustrates a reprojected mesh. The reprojected mesh is a projection of a 3D model of a human on the same plane as represented by the annotated keypoints. The system can use the reprojected mesh to compute the distance between projected keypoints and annotated keypoints, named $E_{ProjectedKeypoint}$ as described above.

Figure 3D:
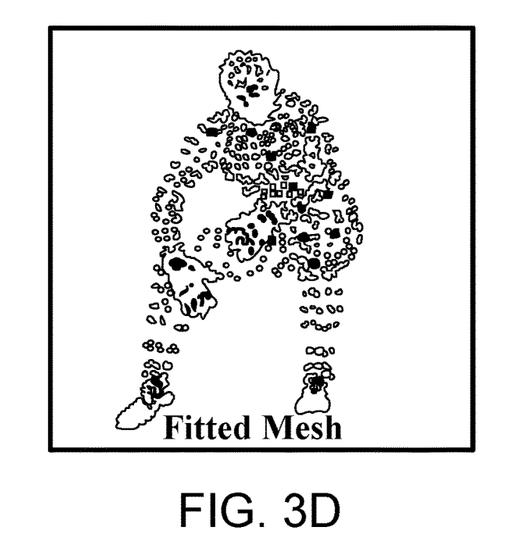

FIG. 3D illustrates the final fitted mesh in 3D space. The system can generate the fitting using an iterative optimization process that minimizes the Chamfer distance and 2D keypoint reprojection loss as described above.

Referring back to FIG. 2, if the input is a user-specified template pose, the system can feed the user-specified pose as the pose parameters for the model directly. The system can then use the model's encoded statistical properties to ensure the physical possibility of the poses. The system can then sample the shape parameters from a Gaussian distribution.

As shown in FIG. 2, the system generates additional poses for the dynamic object (230). With sampled shape and inferred or artificial rare poses, the system can increase the diversity of poses in the dataset in a number of ways. In general, the system can modify the shape or pose parameters to generate additional poses. As one example, the system can fix one set of pose parameters and augment the other. As another example, shapes encoding the model shape $\beta$ can be directly augmented by re-sampling from latent space. In addition to the model shape $\beta$, the system can vary a scaling factor s in order to model various sizes of pedestrians.

In order to get additional poses, the system can apply angle offsets to the joints of an input pose. In some implementations, the system generates random angle offsets while performing additional checks to ensure that joint angles are within proper deviations. For example, the system can add angle offsets for hip joint and knee joints for poses that correspond to sitting, and the system can add angle offsets for pitch and roll parameters for poses that correspond to pedestrians lying down.

As another example, the system can use interpolation for additional exploration in pose space. For example, the system can generate novel poses by interpolating from a pair of estimated poses. The use of interpolation tends to improve the diversification of the dataset in a way that enhances downstream perception systems, even though doing so may occasionally introduce never-seen poses.

To perform interpolation, the system can, for each pose pair (K1, K2), linearly interpolate between corresponding parameters of the poses. For example, the system can use interpolation to generate N additional poses with $K_{new}$=a K1+(1−a), where a is a variable that can be varied between 0.0 and 1.0. Intuitively, small a values allow nearby variations on existing poses, while large a values produce novel poses aggressively. Finally, the system can use the joint limit regularization term described above to remove poses that violate boundary constraints.

The system generates point cloud data for the additional poses generated for the dynamic object (240). In other words, the system can generate LiDAR point cloud data on the augmented pose meshes. In some implementations, the system can use raycasting to generate the point clouds by placing a virtual LiDAR device and an augmented pedestrian mesh M in a scene. The system can then simulate rays being transmitted from the virtual device center and record locations where the rays crossing points on the device plane.

A point with spatial coordinate will be recorded when a ray casts on the mesh surface. In this stage, the system can use two fundamental random variables to serve as other variations of the dataset, including a LiDAR device pose $P_{dev}$, and a grid structure $G_{dev}$.

The point cloud then can be obtained according to:

$$P = \text{RayCasting}(\alpha M, \text{Dev}(P_{dev}, G_{dev})).$$

After the ray casting process, every recorded point is typically precisely recorded on the surface of a human 3D model and without any noise. Compared to real LiDAR datasets where many pedestrians are mostly partially viewed, even after aggregating over sequences, the system provides the unique technological benefit of providing novel viewpoints to render more data for rare poses. Some viewpoints might be never seen in real driving but possible in extreme cases.

The system can further enhance the realism of the generated point clouds using a GAN for domain adaptation. Using a GAN can provide several advantages over prior approaches. As one example, a GAN can more realistically simulate noise that is encountered in an operating environment of an autonomous vehicle. In practice, LiDAR capture is a complex light transportation process involving numerous types of noise. Standard simulations can add heuristic noise such as Gaussian displacement and random dropping. But compared to real-world noise, using Gaussian distributions to add heuristic noise is over-simplified and difficult to tweak. On the other hand, it's time-consuming to build noise models for each LiDAR device according to its physical properties.

Thus, the system can instead use a GAN autoencoder to learn the domain transfer from a synthetic mesh $P_{syn}$ to a point cloud with realistic LiDAR rendering $P_{gen}$. In other words, the system can train a GAN to learn how to transform synthetically generated point cloud data so that it is as indistinguishable as possible from point cloud data generated from real-world driving trips $P_{gt}$.

Figure 4:
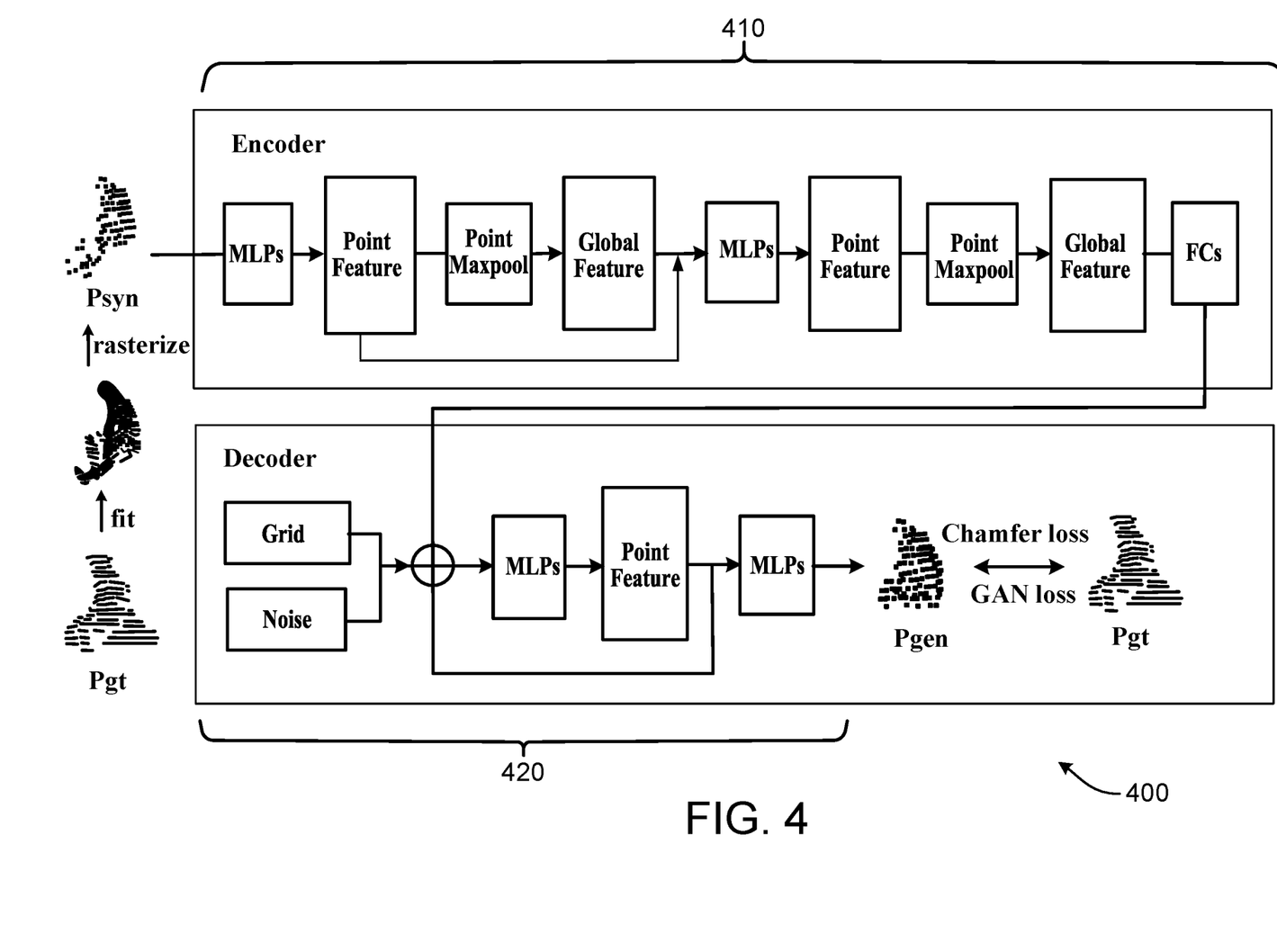
FIG. 4 is a diagram of an example point cloud autoencoder for enhancing realism.

FIG. 4 is a diagram of an example point cloud autoencoder 400. The autoencoder 400 is an example of a GAN that can learn a domain transfer function from a synthetic mesh Psyn to a point cloud with realistic LiDAR rendering Pgen. The autoencoder 400 is an example of a system that can be implemented by a data augmentation system, e.g., the data augmentation subsystem 512 of FIG. 5, in a data augmentation pipeline to enhance the realism of generated point clouds The structure of the point cloud autoencoder 400 includes an encoder 410 and a decoder 420, which can effectively model noise in point clouds. It is particularly helpful to select a model that can learn the shape of objects and that can improve raycasting-based shape estimates.

A data augmentation system can train the GAN using two types of losses: 1) Chamfer distance loss $L_{cd}$ to minimize the point-to-point similarity of two pointsets and to prevent strong deviation from the input, and 2) LS-GAN losses between the generated point cloud data $P_{gen}$ against target real LiDAR point cloud $P_{gt}$. LS-GAN losses include discriminator loss LGAN(D) to classify whether a generated point cloud looks real or synthetic, while the generator loss LGAN(G) works to maximize the realism of generated point cloud. The system can set the GAN loss weights $w_G$, $w_D$ to respective constants during co-training. The system can also use an additional Gaussian variable before the decoder to represent noise variance. Then, at inference time, the system can transform the generated clean point cloud into a more realistic looking version by sampling a new Gaussian variable.

In more detail, the encoder 410 includes a sequence of multilayer perceptron layers (MLPs) and max-pooling layers (Point Maxpool). In some implementations, the data augmentation system implements the architecture of a PointNet encoder as described in Yuan et al., *PCN: Point Completion Network*, in the proceeding of the International Conference on 3D Vision (3DV), pages 728-737 (2018).

The decoder 420 uses one or more multilayer perceptrons (MLPs) that output the point cloud coordinates. In some implementations, the data augmentation system uses the architecture of a FoldingNet decoder as described in Yang et al., *Point Cloud Auto Encoder via Deep Grid Deformation*, in proceedings of the IEEE Conference on Computer Vision and Pattern Recognition, pages 206-215, (2018).

After training the GAN, the system can use the GAN to generate more realistic synthetic point cloud data of rare poses.

The system can then use the generated point cloud data to train a perception model using the additional poses. Thereafter, the perception model will have an enhanced ability to recognize dynamic objects, e.g., pedestrians, even when they have assumed rare poses that were never observed in the real-world but which were generated during the augmentation process.

The performance of the data augmentation approach described above can be evaluated using a particular task, e.g., a classification or a detection task. For example, the system can perform a classification task or a detection task for rare pedestrian poses, which is a fundamental part of overall human detection.

In one example, a perception system can be asked to distinguish pedestrians from a background containing common non-pedestrian objects on the road, e.g., vehicles, cyclists, cones, animals, and signs, to name just a few examples. In a real evaluation, the techniques described in this specification were scored using an F1-max score, defined as the maximum F1 score achievable at different thresholds. The F1 score computes a harmonic mean of precision and recall, and is used to measure the success of a binary classifier and especially when one class is rare. Ideally, a desired data augmentation system should bring gains on the rare pose dataset, while preventing others from degradation.

In the experiment, the evaluation data sets included real rare poses, normal poses, and synthetic rare poses. The real rare pose dataset was prepared based on 2D keypoint heuristics. The real rare pose dataset was annotated with 2D keypoints and filtered out rare pose pedestrians by knee height and sitting height statistics. Pedestrians whose knee is above hip, or the knee height is higher than 0.4 of object height were considered. The filtered examples cover many of the commonly-seen rare poses. A collection of 1000 examples of rare poses in total was split into training and test sets, containing 700 and 300 examples, respectively. The test set served as benchmark for verification, while we fit GHUM model on point clouds from the training set.

The normal pose dataset was generated by selecting pedestrians with height above 1.5 m. All experiments were trained on a large training set consisting of 500,000 pedestrians with regular poses. The test normal pose set had 10,000 samples.

The synthetic rare pose dataset was generated by first creating rare pose datasets from user input. A standard sitting pose and a standard lying pose is manually generated, from which we further augment 250,000 by the techniques described above. In the case when we have a limited training set with rare poses (700 examples), we performed pose interpolation. The system generated another 250,000 synthetic data, which is combined with the synthetic set.

The result of this evaluation showed that using the data augmentation techniques described above provides improved performance for the classification task. In particular, the synthetic rare pose dataset outperformed competing approaches and resulted in a non-marginal improvement over using just the real rare pose dataset or the normal pose dataset alone.

Figure 5:
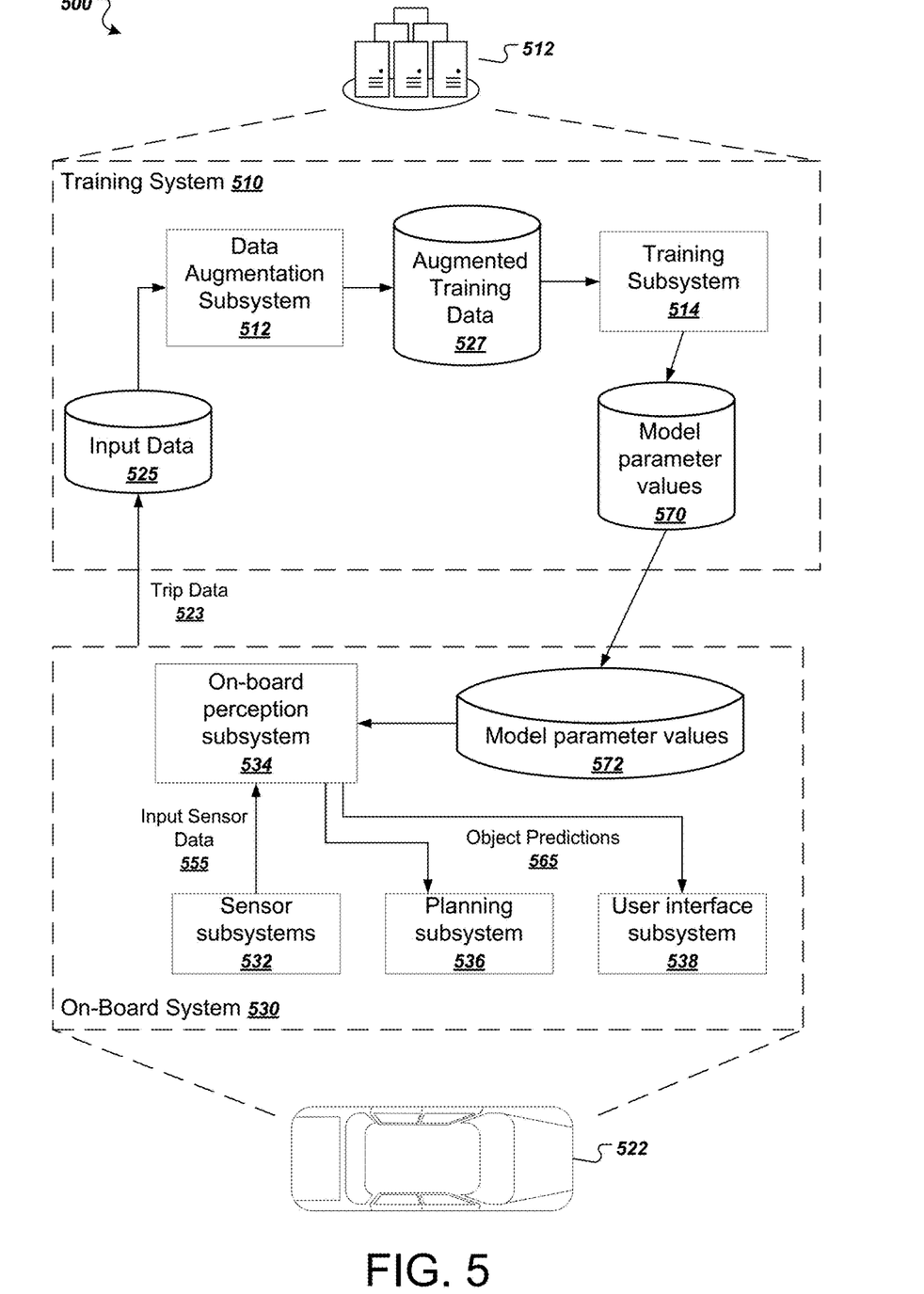
FIG. 5 is a diagram of an example system 500.

FIG. 5 is a diagram of an example system 500. The system 500 is an example of a system that can use the data augmentation techniques described in this specification to improve the performance of perception subsystems for autonomous vehicles. The system 500 includes a training system 510 and an on-board system 520.

The on-board system 520 is physically located on-board a vehicle 522. Being on-board the vehicle 522 means that the on-board system 520 includes components that travel along with the vehicle 522, e.g., power supplies, computing hardware, and sensors. The vehicle 522 in FIG. 5 is illustrated as an automobile, but the on-board system 520 can be located on-board any appropriate vehicle type. The vehicle 522 can be a fully autonomous vehicle that uses object predictions to inform fully-autonomous driving decisions. The vehicle 522 can also be a semi-autonomous vehicle that uses object predictions to aid a human driver. For example, the vehicle 522 can autonomously apply the brakes if an object prediction indicates that a human driver is about to collide with another vehicle or a pedestrian.

The on-board system 520 includes one or more sensor subsystems 532. The sensor subsystems include a combination of components that receive reflections of electromagnetic radiation, e.g., LiDAR systems that detect reflections of laser light, radar systems that detect reflections of radio waves, and camera systems that detect reflections of visible light.

The raw input sensor data indicates a distance, a direction, and an intensity of reflected radiation. Each sensor can transmit one or more pulses of electromagnetic radiation in a particular direction and can measure the intensity of any reflections as well as the time that the reflection was received. A distance can be computed by determining how long it took between a pulse and its corresponding reflection. Each sensor can continually sweep a particular space in angle, azimuth, or both. Sweeping in azimuth, for example, can allow a sensor to detect multiple objects along a same line of sight.

The sensor subsystems 532 provide input sensor data 555 to an on-board perception subsystem 534. The input sensor data 555 can include multiple channels of data, where each channel represents a different characteristic of reflected electromagnetic radiation. Thus, multiple channels of input sensor data 555 can be generated from measurements from the same sensor.

The sensor-subsystems 532, or the on-board perception subsystem 534, or some combination of both, transform raw sensor data into the multiple channels of input sensor data 555. To do so, the on-board system 520 can project the various characteristics of the raw sensor data into a common coordinate system.

The on-board perception subsystem 534 is configured to make one or more predictions about objects, e.g., detections and classifications. The on-board perception subsystem 534 can thus include one or more computing devices having software or hardware modules that implement the respective operations of each layer of a neural network according to an architecture of the neural network.

The on-board perception subsystem 534 can implement its operations by loading a collection of model parameter values 572 that are received from the training system 510. Although illustrated as being logically separated, the model parameter values 570 and the software or hardware modules performing the operations may actually be located on the same computing device or, in the case of an executing software module, stored within the same memory device.

The on-board perception subsystem 534 can use hardware acceleration or other special-purpose computing devices to implement the operations of one or more layers of a neural network. For example, some operations of some layers may be performed by highly parallelized hardware, e.g., by a graphics processing unit or another kind of specialized computing device. In other words, not all operations of each layer need to be performed by central processing units (CPUs) of the on-board neural network subsystem 534.

The on-board perception subsystem 534 can use the input sensor data 555 to generate one or more object predictions 565. Each object prediction represents a region of the environment surrounding the vehicle 522 that is likely to be occupied by an object. Alternatively or in addition, the prediction 565 can represent that an object belongs to a particular class, e.g., a nearby pedestrian. The on-board perception subsystem 534 can then provide the one or more object predictions 565 to a planning subsystem 536, a user interface subsystem 538, or both.

When a planning subsystem 536 receives the one or more object predictions 565, the planning subsystem 536 can use the one or more object predictions 565 to make fully-autonomous or semi-autonomous driving decisions. For example, the planning subsystem 536 can generate a fully-autonomous plan to navigate through or around other vehicles on a highway. As another example, the planning subsystem 536 can generate a semi-autonomous recommendation for a human driver to apply the brakes if a pedestrian is detected.

A user interface subsystem 538 can receive the object predictions 565 and can generate a user interface presentation that indicates the locations of nearby objects, e.g., nearby vehicles. For example, the user interface subsystem 538 can generate a user interface presentation having image or video data containing a representation of the regions of space that are likely to be occupied by pedestrians. An on-board display device can then display the user interface presentation for passengers of the vehicle 522.

The on-board neural network subsystem 534 can also use the input sensor data 555 to generate trip data 523. The trip data 523 can include the projected representations of the different channels of input sensor data. The on-board system 530 can provide the trip data 523 to the training system 510 in offline batches or in an online fashion, e.g., continually whenever it is generated.

The training system 510 is typically hosted within a data center 512, which can be a distributed computing system having hundreds or thousands of computers in one or more locations.

The training system 510 includes a data augmentation subsystem 512 and a training subsystem 514. The data augmentation subsystem 512 can operate on an initial collection of input data 525 to generate an augmented set of training data 527. As described above, the initial collection of input data 525 can include point cloud data, user-specified poses, or both. For example, the point cloud data can be obtained from LiDAR detections represented in the trip data 523 gathered from real-world driving trips. Alternatively or in addition, the collection of input data 525 can include user-specified poses input by one or more users.

The data augmentation subsystem 512 can generate the augmented training data 527 using the techniques described above with reference to FIGS. 1-4. In other words, the data augmentation subsystem 512 can fit the input data to 3D human models, apply one or more diversification techniques to the human models to generate additional or rarely seen poses, use raycasting to generate point cloud data for the additional poses, and then use a GAN to enhance the realism of the generated point cloud data.

The training subsystem 514 can then use the collection of augmented training data 527 to generate a perception model having a set of model parameter values 570. For example, the training subsystem 514 can implement the operations of each layer of a neural network that is designed to make object predictions from input sensor data, e.g., a neural network that can detect pedestrians or classify detected objects as pedestrians. The training subsystem 514 can include a plurality of computing devices having software or hardware modules that implement the respective operations of each layer of the neural network according to an architecture of the neural network. The training neural network generally has the same architecture and parameters as that used by the on-board perception system 534. However, the training system 510 need not use the same hardware to compute the operations of each layer. In other words, the training system 510 can use CPUs only, highly parallelized hardware, or some combination of these.

After training is complete, the training system 510 can provide a final set of model parameter values 571 to the on-board system 520 for use in making fully autonomous or semi-autonomous driving decisions. The training system 510 can provide the final set of model parameter values 571 by a wired or wireless connection to the on-board system 520.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non-transitory program carrier for execution by, or to control the operation of, data processing apparatus. Alternatively or in addition, the program instructions can be encoded on an artificially generated propagated signal, e.g., a machine-generated electrical, optical, or electromagnetic signal, that is generated to encode information for transmission to suitable receiver apparatus for execution by a data processing apparatus. The computer storage medium can be a machine-readable storage device, a machine-readable storage substrate, a random or serial access memory device, or a combination of one or more of them. The computer storage medium is not, however, a propagated signal.

The term "data processing apparatus" encompasses all kinds of apparatus, devices, and machines for processing data, including by way of example a programmable processor, a computer, or multiple processors or computers. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, or a combination of one or more of them.

A computer program (which may also be referred to or described as a program, software, a software application, a module, a software module, a script, or code) can be written in any form of programming language, including compiled or interpreted languages, or declarative or procedural languages, and it can be deployed in any form, including as a standalone program or as a module, component, subroutine, or other unit suitable for use in a computing environment. A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, subprograms, or portions of code. A computer program can be deployed to be executed on one computer or on multiple computers that are located at one site or distributed across multiple sites and interconnected by a communication network.

As used in this specification, an "engine," or "software engine," refers to a software implemented input/output system that provides an output that is different from the input. An engine can be an encoded block of functionality, such as a library, a platform, a software development kit ("SDK"), or an object. Each engine can be implemented on any appropriate type of computing device, e.g., servers, mobile phones, tablet computers, notebook computers, music players, e-book readers, laptop or desktop computers, PDAs, smart phones, or other stationary or portable devices, that includes one or more processors and computer readable media. Additionally, two or more of the engines may be implemented on the same computing device, or on different computing devices.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Computers suitable for the execution of a computer program include, by way of example, can be based on general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer readable media suitable for storing computer program instructions and data include all forms of nonvolatile memory, media and memory devices, including by way of example semiconductor memory devices, e.g., EPROM, EE-PROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a backend component, e.g., as a data server, or that includes a middleware component, e.g., an application server, or that includes a frontend component, e.g., a client computer having a graphical user interface or a Web browser through which a user can interact with an implementation of the subject matter described in this specification, or any combination of one or more such backend, middleware, or frontend components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

In addition to the embodiments described above, the following embodiments are also innovative:

Embodiment 1 is a method comprising:
obtaining a three-dimensional model of a dynamic object, wherein the dynamic object has multiple movable elements that define a plurality of poses of the dynamic object;
obtaining a plurality of template poses of the dynamic object;
generating additional poses for the dynamic object including varying angles of one or more key joints of the dynamic object according to the three-dimensional model; and
generating point cloud data for the additional poses generated for the dynamic object.

Embodiment 2 is the method of embodiment 1, further comprising training a perception model using the generated point cloud data for the additional poses.

Embodiment 3 is the method of any one of embodiments 1-2, wherein generating the additional poses comprises:
obtaining a pair of template poses of the plurality of template poses; and
generating an additional pose including interpolating corresponding parameter values between the pair of template poses.

Embodiment 4 is the method of any one of embodiments 1-3, wherein generating the point cloud data comprises performing a raycasting process from a virtual point, including generating a point in the point cloud when a ray generated by the raycasting process intersects with a point on the three-dimensional model of the dynamic object.

Embodiment 5 is the method of any one of embodiments 1-4, wherein generating the point cloud data comprises simulating noise in an operating environment.

Embodiment 6 is the method of embodiment 5, wherein simulating the noise in the operating environment comprises:
training a point cloud based generative adversarial network (GAN) autoencoder to learn a domain transfer function from the three-dimensional model to point cloud data; and
transforming the generated point cloud data for the additional poses using the trained point cloud based GAN autoencoder.

Embodiment 7 is the method of any one of embodiments 1-6, further comprising:
generating additional point cloud data for one or more of the additional poses including varying an angle of a virtual camera.

Embodiment 8 is the method of any one of embodiments 1-7, further comprising:
adding the generated point cloud data for the additional poses generated for the dynamic object to a collection of training data comprising empirical point cloud data obtained from real-world observations,
wherein training the perception model comprises using both the empirical point cloud data obtained from the real-world observations and the generated point cloud data for the additional poses.

Embodiment 9 is the method of embodiment 8, wherein an additional pose of the additional poses generated for the dynamic object represents a pose that was not observed in the empirical point cloud data.

Embodiment 10 is the method of any one of embodiments 1-9, wherein the three-dimensional model represents moveable human body parts.

Embodiment 11 is the method of any one of embodiments 1-10, further comprising using the perception model trained on the generated point cloud data for the additional poses to detect pedestrians in an operating environment of an autonomous vehicle.

Embodiment 12 is the method of any one of embodiments 1-11, wherein the three-dimensional model represents movable elements of a machine.

Embodiment 13 is a system comprising: one or more computers and one or more storage devices storing instructions that are operable, when executed by the one or more computers, to cause the one or more computers to perform the method of any one of embodiments 1 to 12.

Embodiment 14 is a computer storage medium encoded with a computer program, the program comprising instructions that are operable, when executed by data processing apparatus, to cause the data processing apparatus to perform the method of any one of embodiments 1 to 12.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous.

What is claimed is:
1. A computer-implemented method comprising:
obtaining a three-dimensional model of a dynamic object, wherein the dynamic object has multiple movable elements that define a plurality of poses of the dynamic object;
obtaining a plurality of template poses of the dynamic object;

generating additional poses for the dynamic object including varying angles of one or more key joints of the dynamic object based on the three-dimensional model; and
generating point cloud data for the additional poses generated for the dynamic object,
wherein the point cloud data generated for the additional poses is used to train a perception model of an autonomous vehicle to recognize dynamic objects.

2. The method of claim 1, further comprising training the perception model using the generated point cloud data for the additional poses.

3. The method of claim 1, wherein generating the additional poses comprises:
obtaining a pair of template poses of the plurality of template poses; and
generating an additional pose including interpolating corresponding parameter values between the pair of template poses.

4. The method of claim 1, wherein generating the point cloud data comprises performing a raycasting process from a virtual point, including generating a point in the point cloud data when a ray generated by the raycasting process intersects with a point on the three-dimensional model of the dynamic object.

5. The method of claim 1, wherein generating the point cloud data comprises simulating noise in an operating environment.

6. The method of claim 5, wherein simulating the noise in the operating environment comprises:
training a point cloud based generative adversarial network (GAN) autoencoder to learn a domain transfer function from the three-dimensional model to point cloud data; and
transforming the generated point cloud data for the additional poses using the trained point cloud-based GAN autoencoder.

7. The method of claim 1, further comprising:
generating additional point cloud data for one or more of the additional poses including varying an angle of a virtual camera.

8. The method of claim 1, further comprising:
adding the generated point cloud data for the additional poses generated for the dynamic object to a collection of training data comprising empirical point cloud data obtained from real-world observations,
wherein training the perception model comprises using both the empirical point cloud data obtained from the real-world observations and the generated point cloud data for the additional poses.

9. The method of claim 8, wherein an additional pose of the additional poses generated for the dynamic object represents a pose that was not observed in the empirical point cloud data.

10. The method of claim 1, wherein the three-dimensional model represents moveable human body parts.

11. The method of claim 1, further comprising using the perception model trained on the generated point cloud data for the additional poses to detect pedestrians in an operating environment of the autonomous vehicle.

12. The method of claim 1, wherein the three-dimensional model represents movable elements of a machine.

13. A system comprising:
one or more computers and one or more storage devices storing instructions that are operable, when executed by the one or more computers, to cause the one or more computers to perform operations comprising:
obtaining a three-dimensional model of a dynamic object, wherein the dynamic object has multiple movable elements that define a plurality of poses of the dynamic object;
obtaining a plurality of template poses of the dynamic object;
generating additional poses for the dynamic object including varying angles of one or more key joints of the dynamic object based on the three-dimensional model; and
generating point cloud data for the additional poses generated for the dynamic object,
wherein the system is configured to use the point cloud data generated for the additional poses to train a perception model of an autonomous vehicle to recognize dynamic objects.

14. The system of claim 13, wherein the operations further comprise training the perception model using the generated point cloud data for the additional poses.

15. The system of claim 13, wherein generating the additional poses comprises:
obtaining a pair of template poses of the plurality of template poses; and
generating an additional pose including interpolating corresponding parameter values between the pair of template poses.

16. The system of claim 13, wherein generating the point cloud data comprises performing a raycasting process from a virtual point, including generating a point in the point cloud data when a ray generated by the raycasting process intersects with a point on the three-dimensional model of the dynamic object.

17. The system of claim 13, wherein generating the point cloud data comprises simulating noise in an operating environment.

18. The system of claim 17, wherein simulating the noise in the operating environment comprises:
training a point cloud based generative adversarial network (GAN) autoencoder to learn a domain transfer function from the three-dimensional model to point cloud data; and
transforming the generated point cloud data for the additional poses using the trained point cloud-based GAN autoencoder.

19. The system of claim 13, wherein the operations further comprise:
generating additional point cloud data for one or more of the additional poses including varying an angle of a virtual camera.

20. One or more non-transitory computer storage media encoded with computer program instructions that when executed by one or more computers cause the one or more computers to perform operations comprising:
obtaining a three-dimensional model of a dynamic object, wherein the dynamic object has multiple movable elements that define a plurality of poses of the dynamic object;
obtaining a plurality of template poses of the dynamic object;
generating additional poses for the dynamic object including varying angles of one or more key joints of the dynamic object based on the three-dimensional model; and
generating point cloud data for the additional poses generated for the dynamic object,
wherein the one or more computers are configured to use the point cloud data generated for the additional poses to train a perception model of an autonomous vehicle to recognize dynamic objects.

* * * * *